United States Patent
Braun

(10) Patent No.: US 9,759,204 B2
(45) Date of Patent: Sep. 12, 2017

(54) PISTON PUMP FOR A VEHICLE BRAKE SYSTEM

(71) Applicant: Robert Bosch GmbH, Stuttgart (DE)

(72) Inventor: Rainer Braun, Bad Mergentheim-Markelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 14/366,929

(22) PCT Filed: Oct. 22, 2012

(86) PCT No.: PCT/EP2012/070858
§ 371 (c)(1),
(2) Date: Jun. 19, 2014

(87) PCT Pub. No.: WO2013/091931
PCT Pub. Date: Jun. 27, 2013

(65) Prior Publication Data
US 2014/0363324 A1  Dec. 11, 2014

(30) Foreign Application Priority Data

Dec. 20, 2011 (DE) .................... 10 2011 089 224

(51) Int. Cl.
*F04B 49/22* (2006.01)
*B60T 8/40* (2006.01)
*F04B 1/04* (2006.01)

(52) U.S. Cl.
CPC .......... *F04B 1/0439* (2013.01); *B60T 8/4031* (2013.01); *F04B 1/0408* (2013.01); *F04B 49/22* (2013.01)

(58) Field of Classification Search
CPC ...... F04B 49/22; F04B 1/0408; F04B 1/0439; F04B 53/126; F04B 53/14; F04B 1/0404;
(Continued)

(56) References Cited

U.S. PATENT DOCUMENTS 6,093,003 A * 7/2000 Hauser .................. B60T 8/4031
417/523
6,146,115 A * 11/2000 Alaze .................... B60T 8/4031
417/415

(Continued)

FOREIGN PATENT DOCUMENTS

DE   199 28 913 A1   1/2001
JP   2008-38797 A   2/2006

OTHER PUBLICATIONS

International Search Report corresponding to PCT Application No. PCT/EP2012/070858, mailed Jan. 4, 2013 (German and English language document) (5 pages).

*Primary Examiner* — Devon Kramer
*Assistant Examiner* — Thomas Cash
(74) *Attorney, Agent, or Firm* — Maginot, Moore & Beck LLP

(57) ABSTRACT

A piston pump for a vehicle brake system includes a piston which is mounted in a cylinder so as to be movable along an axis. An inlet valve for introduction of fluid into the cylinder, and a sealing element configured to seal off the piston with respect to the cylinder are located on the piston. A first portion of the piston includes a valve seat of the inlet valve, and a second portion of the piston includes a piston rod. The sealing element includes a projection which engages axially over the first piston portion and extends to the second piston portion.

14 Claims, 2 Drawing Sheets

(58) Field of Classification Search
CPC ...... F04B 53/143; F04B 53/12; B60T 8/4031; B60T 13/168; B60T 8/368; B60T 8/4872; F05C 2225/00; F05C 2253/20
USPC .................................................. 417/470, 549
See application file for complete search history.

(56) References Cited

U.S. PATENT DOCUMENTS

| | | | |
|---|---|---|---|
| 6,276,909 B1* | 8/2001 | Siegel | B60T 8/4031 417/470 |
| 8,414,276 B2* | 4/2013 | Schuller | B60T 8/4031 417/545 |
| 8,523,541 B2* | 9/2013 | Hermann | F04B 1/0452 137/15.19 |
| 2008/0226479 A1* | 9/2008 | Schuller | B60T 8/4031 417/545 |
| 2011/0239857 A1 | 10/2011 | Iyatani | |

* cited by examiner

PISTON PUMP FOR A VEHICLE BRAKE SYSTEM

This application is a 35 U.S.C. §371 National Stage Application of PCT/EP2012/070858, filed on Oct. 22, 2012, which claims the benefit of priority to Serial No. DE 10 2011 089 224.9, filed on Dec. 20, 2011 in Germany, the disclosures of which are incorporated herein by reference in their entirety.

The disclosure relates to a piston pump for a vehicle brake system having a piston which is mounted in a cylinder such that it can be displaced along an axis, on which piston an inlet valve for introducing fluid into the cylinder and a sealing element for sealing the piston against the cylinder are arranged, and on which piston a first piston section is formed with a valve seat of the inlet valve and a second piston section is formed as a piston rod. Furthermore, the disclosure relates to the use of a piston pump of this type in a hydraulic assembly for a vehicle brake system.

BACKGROUND

DE 199 28 913 A1 has disclosed a piston pump, in which, in a pump housing, a single pump element or a pump unit is formed by a piston which is mounted displaceably in a cylinder bore of a cylinder. The piston sucks brake fluid through a feed opening into the cylinder bore and conveys it out of the cylinder bore through an outlet opening. The piston is pushed into the cylinder bore and is sealed therein with respect to the cylinder by means of a sealing element. Said sealing element is also called a high pressure seal.

Pistons of known piston pumps have a first piston section partially as a first component, on which first piston section a valve seat for an inlet valve is situated. As a second, separate component, pistons of this type have a second piston section which forms the actual piston rod. Said piston rod is driven as a rule by means of an eccentric.

SUMMARY

According to the disclosure, a piston pump for a vehicle brake system is provided having a piston which is mounted in a cylinder such that it can be displaced along an axis, on which piston an inlet valve for introducing fluid into the cylinder and a sealing element for sealing the piston against the cylinder are arranged, and on which piston a first piston section is formed with a valve seat of the inlet valve and a second piston section is formed as a piston rod. According to the disclosure, the sealing element is configured with a projection which reaches axially over the first piston section as far as the second piston section.

By way of the solution according to the disclosure, the piston of the piston pump is reached over in that piston section, on which the valve seat of the inlet valve is situated. Therefore, in the piston according to the disclosure, that piston section with the valve seat can be configured as a separate component which is situated between the sealing element and the second piston section and nevertheless does not have to be mounted individually on the sealing element and the second piston section. Rather, the first piston section according to the disclosure can be inserted, in particular, into the projection, and the projection can then be mounted in a simple way on the second piston section. In this way, a component such as the valve seat which may have only low production tolerances can be produced and positioned separately on the projection.

As a result, the assembly of the piston pump according to the disclosure becomes simpler, fewer and simpler components can be used, and the valve seat can also be produced less expensively. In particular, the first piston section which has the valve seat can be produced from a different, less expensive material than steel. Furthermore, the valve seat can be configured by means of a simpler injection molded part. In particular, the projection is therefore configured in one piece with the sealing element because both elements can then be formed in a single injection molding process. One assembly step can therefore be dispensed with. Furthermore, the number of parts is therefore reduced further.

Furthermore, the projection according to the disclosure is advantageously configured to be permeable for fluid, in particular brake fluid, in the region of the first piston section. To this end, the projection can serve as an inlet region for fluid into the piston. The projection particularly preferably has a slotted shape. The projection of this type can be demolded simply from an injection mold. Here, the first piston section preferably forms an inlet region for introducing fluid into the piston as far as the valve seat of the inlet valve. In particular, to this end, the first piston section is of hollow-cylindrical or tubular configuration and is itself configured with one or more radially directed inlets for fluid which is to be fed in.

A seal with respect to the first piston section is preferably formed on the sealing element or its projection. By way of the seal, a fluid-tight coupling between the first piston section with its valve seat for the inlet valve and the sealing element is produced. The seal then ensures that, at the inlet to the cylinder, the inlet valve represents the only through-flow possibility for fluid which is to be delivered.

Furthermore, in the piston pump according to the disclosure, a length compensation element is preferably arranged between the first and the second piston section. Production tolerances which result, in particular, during the material-removing production of a housing which surrounds the cylinder can be compensated for in a simple way by way of the length compensation element. Said housings are configured as a rule from an aluminum block, in which a stepped receiving bore is formed for the cylinder.

The length compensation element is preferably configured as an annular disk. An annular disk of this type can be inserted with low expenditure between the first and the second piston section during the assembly of the piston pump according to the disclosure. As an alternative or in addition to a rigid or pressure-resistant length compensation element, a flexible compensation element also be provided, in particular in the form of an elastic ring or an at least partially resilient bevel or a shoulder on one of the relevant components.

The first piston section is advantageously of axial design in a continuation of the second piston section. This means that, as viewed in cross section, the first piston section advantageously has substantially the same radial extent and preferably also contour as the second piston section. In particular, in cross section, the first piston section preferably has a circular shape with the same diameter as the second piston section.

Furthermore, in the piston pump according to the disclosure, the sealing element is preferably configured with a valve cage which receives a closing body of the inlet valve. The valve cage is therefore preferably configured in one piece with the sealing element. The component which is formed in this way comprising valve cage, sealing element and projection provides a basic structure, into which, advantageously one after another, a restoring spring of the inlet valve, a closing body of the inlet valve and finally the first piston section with its valve seat of the inlet valve can be mounted. The components can then be attached to the second piston section in a single assembly step, as a result of which the complete piston for the piston pump according to the disclosure is formed. Correspondingly, furthermore, a restoring spring of the inlet valve is advantageously supported on the valve cage.

During attachment to the second piston section, the projection of the sealing element has particularly advantageously been pressed onto said second piston section. The pressing can be configured in an inexpensive way in an automated production device.

Finally, precisely on account of the advantages in automated production, the solution according to the disclosure is also directed to the use of the piston pump which is produced in this way in a hydraulic assembly for a vehicle brake system.

BRIEF DESCRIPTION OF THE DRAWINGS

In the following text, one exemplary embodiment of the solution according to the disclosure will be explained in greater detail using the appended diagrammatic drawings, in which.

DETAILED DESCRIPTION

Figure 1:
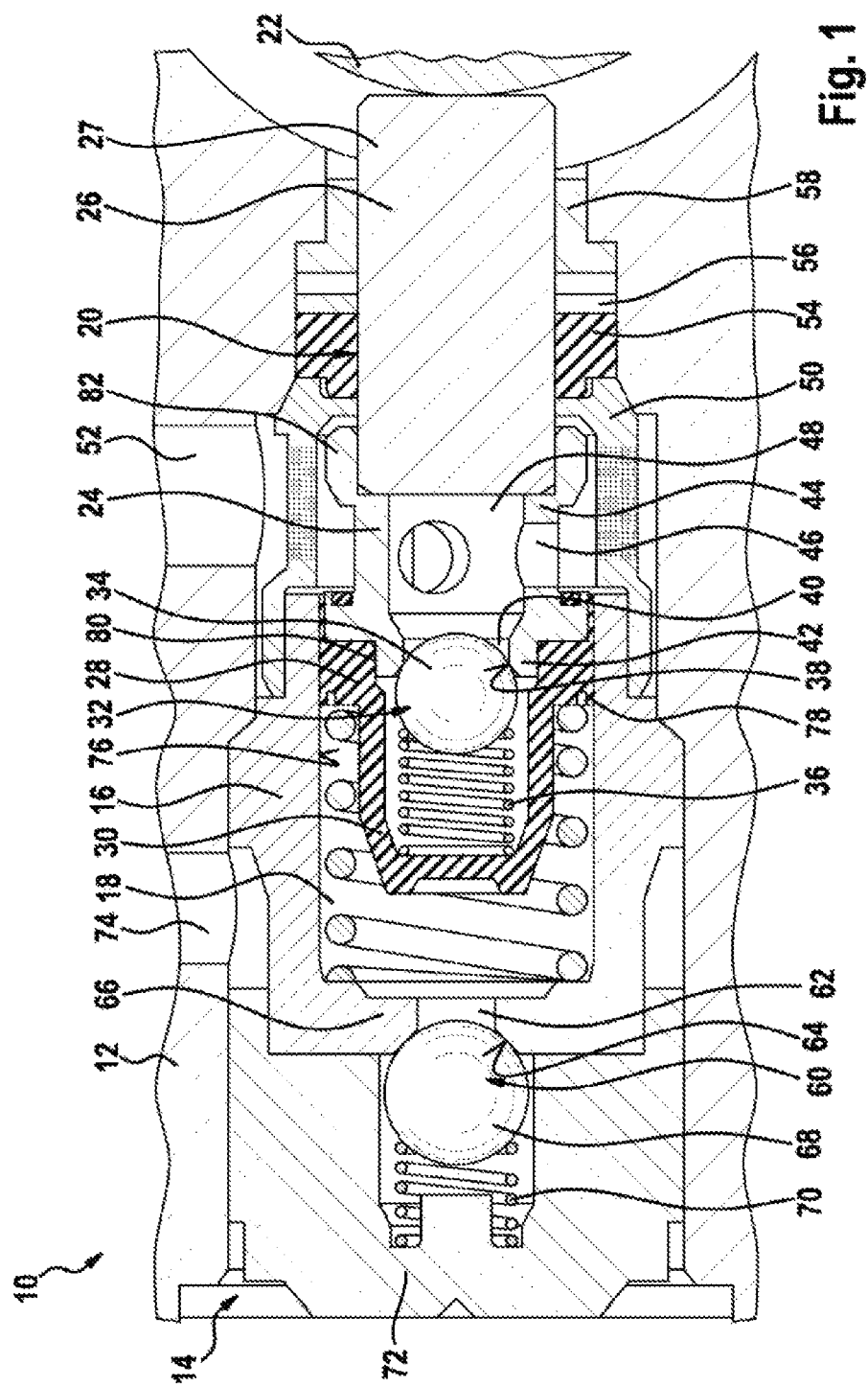
FIG. 1 shows a longitudinal section of a piston pump according to the prior art.

FIG. 1 shows a piston pump 10 of a hydraulic assembly (not illustrated further) of a vehicle brake system, which hydraulic assembly is configured with a block-shaped housing 12 made from aluminum. A stepped housing bore 14 is formed in the housing 12, in which stepped housing bore 14 a cylinder 16 is arranged, inter alia.

The cylinder 16 has a cylinder bore 18 which is circular in cross section and in which a piston 20 is mounted displaceably. The piston 20 serves to deliver brake fluid within the hydraulic assembly and in the vehicle brake system and, to this end, is displaced to and fro in the cylinder bore 18 via an eccentric 22.

The piston 20 is formed from a first piston section 24 and a second piston section 26 and, furthermore, has a sealing element 28. A valve cage 30 of an inlet valve 32 is connected in one piece to the sealing element 28. Furthermore, a closing body 34 which is pushed against a valve seat 38 by a restoring spring 36 belongs to the inlet valve 32. The valve seat 38 encloses a valve opening 40. The valve opening 40 is arranged together with the valve seat 38 on the first piston section 24. Here, the piston section 24 is of substantially cup-shaped configuration with a bottom 42 and an annular or hollow-cylindrical wall 44. A plurality of inlet openings 46 are formed in the wall 44, through which inlet openings 46 brake fluid can flow from the outside into an interior 48 of the cup-shaped first piston section 24.

The inlet openings 46 are surrounded radially on the outside by an annular filter 50, through which brake fluid which comes from an inlet line 52 which is formed in a housing 12 can be fed into the interior 48. The annular filter 50 is supported axially on one side on the cylinder 16 and on the other side on the housing 12, said annular filter 50 at the same time retaining a sealing ring 54, a supporting ring 56 and a guide ring 58 in the stepped cylinder bore 18. The piston 20 is guided with its second piston section 26 radially on the outside on the guide ring 58.

Here, the second piston section 26 forms a piston rod 27, by way of which the pressure forces which emanate from the eccentric 22 are transmitted to the first piston section 24 and further to the sealing element 28. The sealing element 28 is then pressed together with the first piston section 24 into the cylinder bore 18. There, it displaces brake fluid which had previously flowed into the cylinder bore 18 through the inlet valve 32.

The brake fluid passes out of the cylinder bore 18 through an outlet valve 60 which is configured with a valve opening 62 and an associated valve seat 64 on the bottom 66 of the cylinder 16. Furthermore, a closing body 68 which is pressed against the valve seat 64 by means of a restoring spring 70 belongs to the outlet valve 60. The restoring spring 70 is supported on a cylinder projection in the manner of a cover 72, by way of which the cylinder bore 18 is closed on the outside. The brake fluid which escapes from the cylinder 16 in this way through the valve opening 62 passes under pressure into an outlet line 74 which is likewise configured in the housing 12.

For sealing on an inner circumferential face 76 of the cylinder bore 18, the sealing element 28 is configured with a sealing lip 78 which runs around radially on the outside there. Furthermore, the sealing element 28 is pressed radially on the inside onto the bottom 42 of the first piston section 24, with the result that a seal 80 is produced there.

The first piston section 24 reaches with its end region 82 which is directed toward the eccentric 22 around the second piston section 26 and is pressed with the latter on said end region 82.

Figure 2:
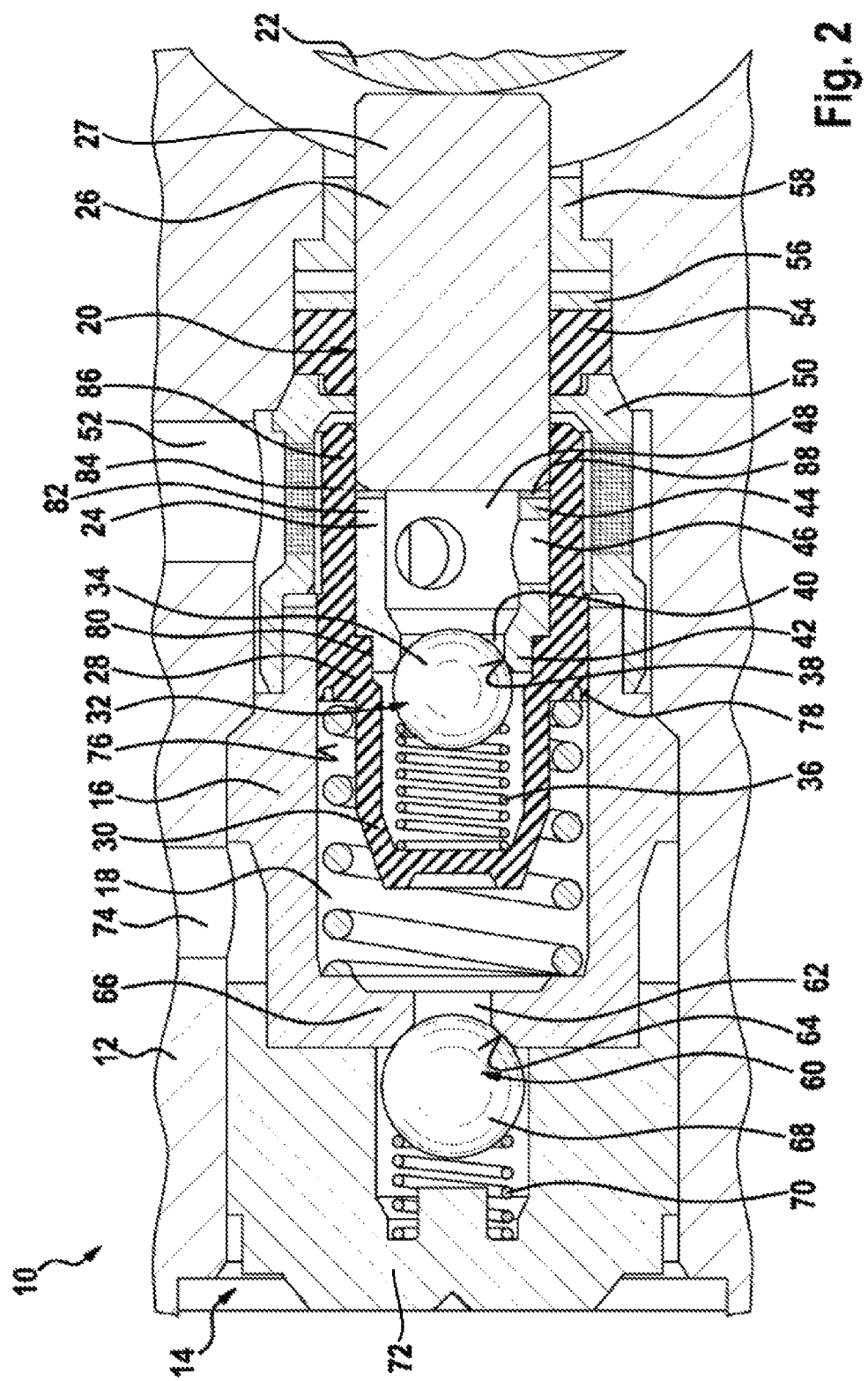
FIG. 2 shows a longitudinal section of a piston pump according to the disclosure.

FIG. 2 illustrates an embodiment according to the disclosure of a piston pump 10 which is configured largely like the piston pump 10 which is shown in FIG. 1. In the piston pump 10 according to FIG. 2, however, the sealing element 28 is configured with a tubular projection 84 which is directed axially in the direction of the eccentric 22. Said projection 84 reaches over the first piston section 24 there completely in the axial direction and is pressed with its end region 86 which is directed toward the eccentric 22 onto the second piston section 26.

The projection 84 is configured to be permeable for brake fluid in the region of the first piston section 24, for which purpose axial slots (not shown) are formed in the projection 84.

The first piston section 24 according to FIG. 2 is configured in such a way that it is received completely in the projection 84 and is configured with regard to its cross-sectional shape as a continuation of the second piston section 26. Here, if required, a length compensation element 88 in the form of a very thin annular disk is provided between the first piston section 24 and the second piston section 26.

The invention claimed is:

1. A piston pump for a vehicle brake system comprising:
 a cylinder defining an axis;
 a piston mounted in the cylinder in such a way that the piston is displaceable along the axis, the piston including:
  a first piston section defining a valve seat;
  a second piston section formed as a piston rod; and
  a sealing element arranged directly on the first and second piston sections and which seals the piston against the cylinder, the sealing element including a projection which abuts over a complete axial length of a circumferential portion of an outer surface of the first piston section and further abuts a lower portion of the second piston section; and an inlet valve arranged on the piston and configured to cooperate with the valve seat for introduction of fluid into the cylinder, wherein the first piston section is a separate component from the second piston section and the sealing element.

2. The piston pump as claimed in claim 1, wherein the projection is permeable to fluid in a region of the first piston section.

3. The piston pump as claimed in claim 1, wherein the sealing element seals into the first piston section so as to form a seal with respect to the first piston section.

4. The piston pump as claimed in claim 1, wherein the first piston section is an axial continuation of the second piston section such that a first outer circumference of a first end of the first piston section nearest to the second piston section is equal to a second outer circumference of a portion of the second piston section.

5. The piston pump as claimed in claim 1, wherein the sealing element includes a sealing lip which seals against the cylinder.

6. The piston pump as claimed in claim 1, further comprising a filter circumferentially surrounding a portion of the first piston section.

7. The piston pump as claimed in claim 1, wherein the first and second piston sections are radially spaced apart from the cylinder along an entire axial length of the first and second piston sections.

8. The piston pump as claimed in claim 1, wherein the sealing element is the only portion of the piston that contacts the cylinder.

9. The piston pump as claimed in claim 1, wherein a length compensation element is interposed between the first piston section and the second piston section.

10. The piston pump as claimed in claim 9, wherein the length compensation element is shaped as an annular disk.

11. The piston pump as claimed in claim 1, wherein the sealing element includes a valve cage configured to receive a closing body of the inlet valve.

12. The piston pump as claimed in claim 11, wherein a restoring spring of the inlet valve is supported by the valve cage.

13. The piston pump as claimed in claim 11, wherein the valve cage is formed in one piece with the sealing element.

14. A hydraulic assembly for a vehicle brake system, comprising:

a piston pump that includes:
  a cylinder defining an axis;
  a piston mounted in the cylinder in such a way that the piston is displaceable along the axis, the piston including:
    a first piston section defining a valve seat;
    a second piston section formed as a piston rod; and
    a sealing element arranged directly on the first and second piston sections and which seals the piston against the cylinder, the sealing element including a projection which abuts over a complete axial length of a circumferential portion of an outer surface of the first piston section and further abuts a lower portion of the second piston section; and
  an inlet valve arranged on the piston and configured to cooperate with the valve seat for introduction of fluid into the cylinder,
  wherein the first piston section is a separate component from the second piston section and the sealing element.

* * * * *